UNITED STATES PATENT OFFICE.

HENRY STEEPLES WEST AND JOHN LETFORD SMITH, OF FORT COLLINS, COLORADO.

LEATHER-DRESSING.

1,128,926. Specification of Letters Patent. Patented Feb. 16, 1915.

No Drawing. Application filed April 11, 1914. Serial No. 831,267.

*To all whom it may concern:*

Be it known that we, HENRY STEEPLES WEST and JOHN LETFORD SMITH, citizens of the United States, residing at Fort Collins, in the county of Larimer and State of Colorado, have invented a new and useful Composition of Matter to be Used as a Leather Dressing or Finishing Material for Leather or other Upholstering-Coverings, of which composition and the process of manufacturing the same the following is a specification.

The object of our invention is to provide a dressing or finishing material for leather, imitation leathers, and other coverings that will soften and preserve the material upon which it is used and form a tough, smooth and glossy surface that will not easily crack and of lasting quality. We obtain these results by the composition of matter consisting of the following ingredients: wax, linseed oil, asphaltum, japan, coloring pigment, and a thinning liquid.

The materials used in the composition are preferably: beeswax; linseed oil, either raw or boiled as it is heated or boiled in the process of making this composition; turpentine asphaltum; turpentine japan; coloring pigment ground in oil, turpentine, or japan, and if for black finish we preferably use drop black ground in japan; and a volatile thinning liquid such as gasolene, turpentine or alcohol, and for this we find the gasolene the most suitable.

We find the composition best consisting of the following ingredients, combined as hereinafter set forth, in substantially the proportions stated, viz: beeswax, 2 ounces, or from 1½% to 2%; linseed oil, 12 ounces, or from 9% to 10%; turpentine asphaltum, 32 ounces, or from 24% to 26%; turpentine japan, 16 ounces, or from 12% to 13%; drop black, 4 ounces, or from 3% to 4%; gasolene, 62 ounces, or from 45% to 55%.

The above composition is that to be used for a black finish. The drop black used as coloring is preferably drop black ground in japan. Any ground pigment may be used depending upon the shade or color of dressing desired. The thinner may be other than gasolene if desired, but we find gasolene best on account of its time in evaporation. The proportions given above may be varied according to the character of material to be finished or dressed.

In combining these ingredients, the beeswax is cut in small pieces and placed in the linseed oil and the two heated to boiling until thoroughly melted and mixed. Then the turpentine asphaltum, turpentine japan, and coloring pigment are successively added and thoroughly stirred in the mixture while hot. Then this is allowed to cool and the gasolene stirred in to thin the composition ready for application and use.

In using this composition as a dressing or finish, the surface of the leather or other material to be dressed is cleaned and dried. Then the composition is applied with a brush or cloth and allowed to set and dry. If necessary or desired other coats of the dressing may be applied after the first is dry.

By the use of this preparation new or old worn leather is softened and preserved and given a tough, smooth and glossy surface of long lasting duration and will not easily scar or crack.

We claim:

1. The composition of matter consisting of the following ingredients in substantially the proportions stated, viz: wax one part, linseed oil six parts, asphaltum sixteen parts, japan eight parts, coloring pigment two parts, and thinning liquid thirty one parts.

2. The composition of matter consisting of beeswax approximately one part, linseed oil approximately six parts, turpentine asphaltum approximately sixteen parts, turpentine japan approximately eight parts, coloring pigment approximately two parts, and gasolene approximately thirty one parts, substantially as described.

3. The composition of matter consisting of the following ingredients in substantially the proportions stated, viz: beeswax 2 ounces, linseed oil 12 ounces, turpentine asphaltum 32 ounces, turpentine japan 16 ounces, drop black 4 ounces, and gasolene 62 ounces.

4. The process of preparing leather dressing consisting of heating together and mixing wax and linseed oil, then adding successively turpentine asphaltum, turpentine japan, and coloring pigment and mixing while the mixture is hot, and allowing said mixture to cool and adding a volatile thinning liquid, substantially as described.

5. The process of preparing leather dressing consisting of heating and mixing together beeswax and linseed oil, then adding turpentine asphaltum, turpentine japan, and coloring pigment and mixing the same with the heated beeswax and linseed oil while hot, and allowing the mixture to cool and adding gasolene, substantially as described.

HENRY STEEPLES WEST.
JOHN LETFORD SMITH.

Witnesses:
JAMES E. WALKER,
WILLA GOAD.